F. GRODI.
HEADLIGHT CONTROL FOR AUTOMOBILES.
APPLICATION FILED AUG. 28, 1919.

1,429,283.

Patented Sept. 19, 1922.
2 SHEETS—SHEET 1.

F. GRODI.
HEADLIGHT CONTROL FOR AUTOMOBILES.
APPLICATION FILED AUG. 28, 1919.
1,429,283.
Patented Sept. 19, 1922.
2 SHEETS—SHEET 2.
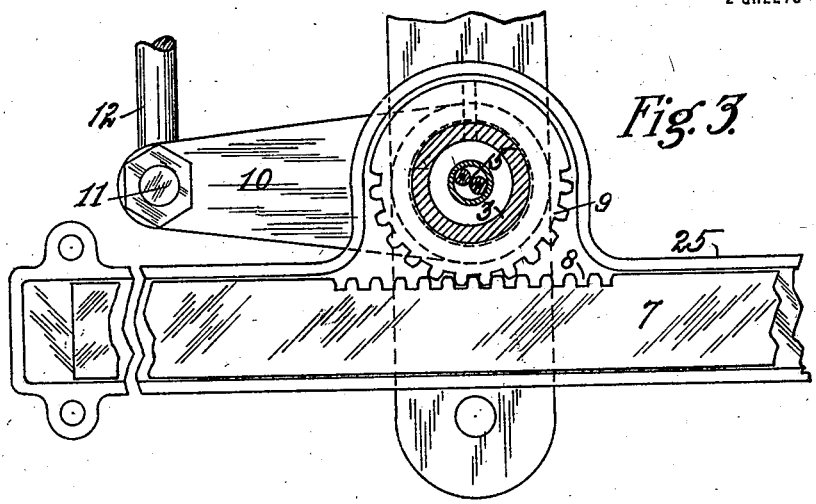
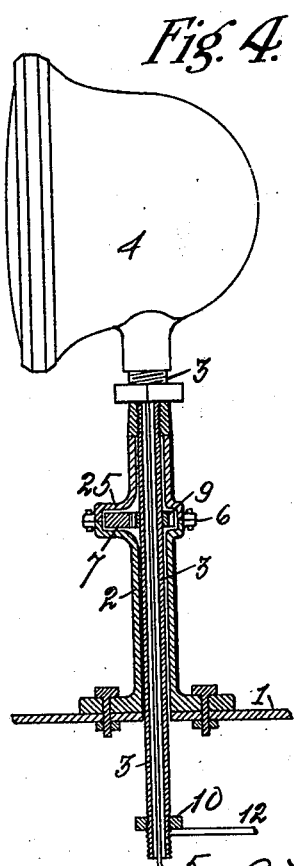

Patented Sept. 19, 1922.

1,429,283

UNITED STATES PATENT OFFICE.

FLADGET GRODI, OF CURTIS, OHIO.

HEADLIGHT CONTROL FOR AUTOMOBILES.

Application filed August 28, 1919. Serial No. 320,335.

*To all whom it may concern:*

Be it known that I, FLADGET GRODI, a citizen of the United States, residing at Curtis, in the county of Ottawa and State of Ohio, have invented certain new and useful Improvements in Headlight Controls for Automobiles; and I do declare the following to be a full, clear, and exact description of the invention, such as will enable others, skilled in the art to which it appertains, to make and use the same, reference being had to the accompanying drawings, and to the figures of reference marked thereon, which form a part of this specification.
My invention relates to and its object is to provide devices by means of which the head-lights of an automobile will, through connections with the steering gear, be caused to automatically and invariably turn and throw their light in the direction of the travel of the car. To this end my invention consists in the construction and arrangement of parts hereinafter described, and illustrated in the accompanying drawings, in which—

Figure 1:
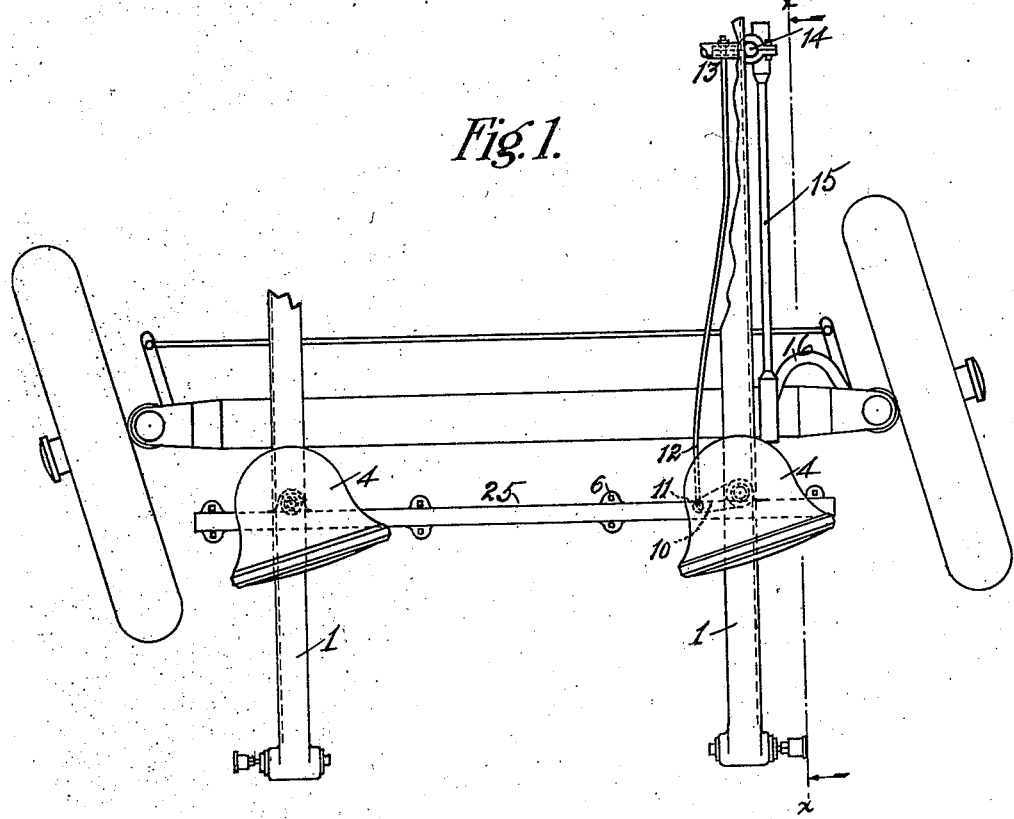
Figure 2:
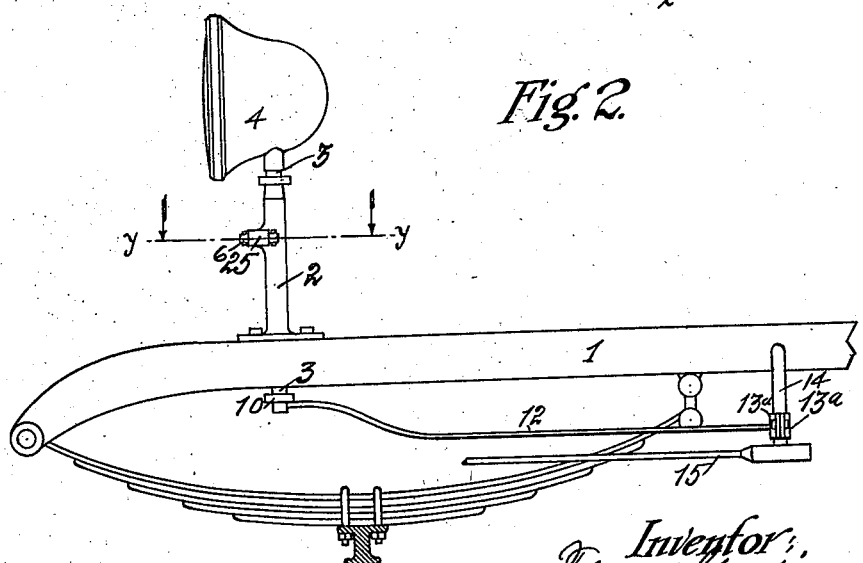

Figure 1, is a top-plan view of the forward part of the chassis of an automobile provided with my head-light control; Fig. 2 a side-elevation of the same taken on line *x—x* Fig. 1; Fig. 3 a plan-view, on an enlarged scale, taken on line *y—y* Fig. 2, and Fig. 4, a side-elevation, on an enlarged scale, of one of my head-lights showing its supporting standard, together with the rack-bar, pinion and operating spindle, hereinafter referred to, in vertical section.

Like numerals of reference indicate like parts throughout the drawings.

In the drawings, 1—1 represent the side-members of the frame of the chassis of an automobile. Upon these side-members, near their forward ends, are rigidly secured upright hollow standards 2—2. Within each of the hollow standards is revolubly supported a hollow spindle 3, which projects above the standard and below the side-bar 1. Each of the spindles at its top is operatively connected with the usual head-light, consisting of a hood 4, provided with the necessary reflector, lens and lamp. The lamp, not shown, is furnished with electric current through flexible conductors 5 leading from a suitable source of electricity and extending up through the hollow spindles to the lamps.

The two standards 2—2 are rigidly connected by means of a horizontal cross-bar 25. This bar is hollow and is composed of upper and lower parts separably connected by suitable bolts and nuts, as at 6. Within the hollow cross-bar 25 is mounted a reciprocable bar 7, formed—for a short distance opposite the spindles 3—as a toothed rack, as at 8, Fig. 3. These toothed portions are engaged by pinions 9 secured to the spindles 3. A portion of each of the standards 2 is enlarged to receive and to form a housing for the pinions and racks at the points where they are engaged. It will now be seen that by reason of the connections between the two spindles 3, as just described, the two head-lights must turn in unison to the right or left.

Rigidly connected to the projecting lower end of the spindle 3 nearest the operator's side of the car, is a horizontal arm 10 to which is pivotally secured, as at 11, the forward end of a rod 12 which leads backwardly to and is connected, as at 13, with a steering-ball arm 14. This arm at its lower end is connected with and controls the steering rod 15 which is connected at its forward end with the usual steering knuckles 16. The connection 13 consists, preferably, for example, of two clamping members, 13ᵃ, which are vertically adjustable on the arm 14. This adjustment varies the horizontal throw of the rod 12 and, consequently, the extent of the turning of the head-lights with the movement of the steering-gears.

The steering-wheel and its connections with the steering knuckles are well understood and need not here be further illustrated or described.

The operation of my device will now be obvious. The arm which gives motion to the connecting rod which actuates the steering-knuckles being swung to turn the forward wheels of the machine to the right or left, a corresponding motion will be communicated to the head-lights.

Having described my invention, what I claim and desire to secure by Letters Patent of the United States, is—

In combination with a motor vehicle embodying a frame, a pair of front wheels carried by the frame, steering mechanism for the wheels including a steering arm, and linkage from the arm to the wheels, of a second link adjustably connected to said arm, a pair of upright tubular standards carried in parallel relation by the frame between the wheels, a headlight mounted on each standard and provided with a tubular bearing through the standard, light connections through said tubular bearing for each headlight, a crank on one of said bearings to which the link from the steering arm is directly connected, a housing between the standards and spaced from the frame, a pinion carried by each bearing in communication with the housing between the standards, and a rack in the housing reciprocable by the pinion on the crank carrying bearing for shifting the other bearing simultaneously therewith whereby the connection for directing the headlights is from the steering mechanism and independently of receiving wheel vibration.

In testimony whereof I affix my signature in presence of two witnesses.

FLADGET GRODI.

Witnesses:
 MARK WINCHESTER,
 L. MAE SILVERTHORNE.